(12) United States Patent
Brookhart et al.

(10) Patent No.: US 10,364,050 B2
(45) Date of Patent: Jul. 30, 2019

(54) SYSTEM AND METHOD FOR HEALTH ASSESSMENT OF AIRCRAFT STRUCTURE

(71) Applicant: Sikorsky Aircraft Corporation, Stratford, CT (US)

(72) Inventors: Andrew Brookhart, Wallingford, CT (US); Preston R. Bates, Fort Worth, TX (US); Mark W. Davis, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/300,655

(22) PCT Filed: Apr. 1, 2015

(86) PCT No.: PCT/US2015/023811
§ 371 (c)(1),
(2) Date: Sep. 29, 2016

(87) PCT Pub. No.: WO2015/195184
PCT Pub. Date: Dec. 23, 2015

(65) Prior Publication Data
US 2017/0183107 A1    Jun. 29, 2017

Related U.S. Application Data

(60) Provisional application No. 61/974,176, filed on Apr. 2, 2014.

(51) Int. Cl.
*B64F 5/60* (2017.01)
*G06Q 10/08* (2012.01)
(Continued)

(52) U.S. Cl.
CPC .............. *B64F 5/60* (2017.01); *G06Q 10/08* (2013.01); *G07C 5/0808* (2013.01); *B64D 2045/0085* (2013.01)

(58) Field of Classification Search
CPC .. B64F 5/60; G07C 5/0808; B64D 2045/0085
See application file for complete search history.

(56) References Cited

U.S. PATENT DOCUMENTS 5,987,397 A * 11/1999 McCool ................. G01G 19/07
700/38
6,128,951 A    10/2000 Nance
(Continued)

OTHER PUBLICATIONS

Written Opinion of the International Searching Authority for International Application No. PCT/US2015/023811 dated Nov. 6, 2015; dated Dec. 21, 2015; 7 pages.
(Continued)

*Primary Examiner* — Nadeem Odeh
*Assistant Examiner* — Michael V Kerrigan
(74) *Attorney, Agent, or Firm* — Cantor Colburn LLP

(57) ABSTRACT

A method of health monitoring and assessment of an aircraft structure includes collecting data from a plurality of sensors located at one or more components of the aircraft. The sensors assess a physical condition of the components and are arrayed in one or more aircraft zones. The data is communicated to a health assessment module, which calculates one or more component structural condition indicators of each component. The component structural condition indicators are compiled and one or more component structural health indicators are calculated. The component structural health indicators are compiled by aircraft zone and a zone structural health indicator is calculated based on the component structural health indicators of components residing in the particular aircraft zone. An aircraft level health indicator is calculated based on the zone structural health indicators and one or more maintenance actions are recommended based on the structural condition and health indicators.

25 Claims, 3 Drawing Sheets

(51) Int. Cl.
*G07C 5/08* (2006.01)
*B64D 45/00* (2006.01)

(56) References Cited

U.S. PATENT DOCUMENTS

| | | | |
|---|---|---|---|
| 7,328,625 | B2 | 2/2008 | Sundermeyer et al. |
| 7,532,988 | B2 | 5/2009 | Khibnik et al. |
| 2010/0042283 | A1* | 2/2010 | Kell ................ G06Q 10/06 701/29.3 |
| 2012/0041639 | A1 | 2/2012 | Followell et al. |
| 2012/0053784 | A1 | 3/2012 | Schmidt et al. |
| 2015/0268152 | A1* | 9/2015 | Friedersdorf .......... G01N 17/04 73/25.01 |

OTHER PUBLICATIONS

EP Communication; Extended European Search Report; Application No. 15809378.1-1958/3127089 PCT/US2015023811; dated Sep. 1, 2017; pp. 1-5.
International Preliminary Report on Patentability; International Application No. PCT/US2015/023811; International Filing Date: Apr. 1, 2015; dated Oct. 4, 2016; pp. 1-8.
Notification of Transmittal of the International Search Report for International Application No. PCT/US2015/023811 dated Nov. 6, 2015; dated Dec. 21, 2015; 8 pages.
Brookhart et al.; "Airframe Structural Integrity Management: A UH-60 Application and Demonstration"; Presented at the AHS 70th Annual Forum in Montreal, Quebec, Canada; May 20-22, 2014; 14 Pages.
Abbott, W. H., "A Decade of Corrosion Monitoring in the World's Military Operating Environments—A Summary of Results" 2008, 290 pages.
Reifenberger, R, Mendoza, C, "UH-60 Airframe Condition Evaluation (ACE) Technical Review 2011", Jan. 2012.
Bates et al.; "Technology Development to Enable Capability-Based Operations and Sustainment"; Presented at the American Helicopter Society 68th Annual Forum in Fort Worth, Texas; May 1-3, 2012; 12 Pages.
Bates et al; "Structural Usage Monitoring and Flight Regime Recognition—Compliance Validation arid Demonstration Using the Health and Usage Monitoring System Advisory Circular 29-2C MG 15"; National Technical information Services and Federal Aviation Administration; Sep. 2012; 213 Pages.
Isom et al.; "Flight Test of Technology of Virtual Monitoring of Loads"; Presented at the AHS 69th Annual Forum in Phoenix, Arizona; May 21-23, 2013; 20 Pages.
Lee et al.; "Comparison of the Effects of Applied Loads and Temperature Variations on Guided Wave Propagation"; ResearchGate; Jun. 2011; 9 Pages.
Wilcox et al; "A Comparisan of Temperature Compensation Methods for Guided Wave Structural Health Monitoring"; ResearchGate; Feb. 2008; 9 Pages.

* cited by examiner

SYSTEM AND METHOD FOR HEALTH ASSESSMENT OF AIRCRAFT STRUCTURE

FEDERAL RESEARCH STATEMENT

This invention was made with government support with the United States Army under Contract No. W911W6-10-2-0006. The government therefore has certain rights in this invention.

CROSS-REFERENCE TO RELATED APPLICATIONS

This application is a National Phase Application of Patent Application PCT/US2015/023811 filed on Apr. 1, 2015, the contents of which are incorporated herein by reference in its entirety.

BACKGROUND

The subject matter disclosed herein generally relates to health monitoring of aircraft. More specifically, the subject disclosure relates to aircraft structure health assessment.

Aerospace vehicles, such as airplanes and helicopters, face many sources of potential damage, from things such as flight loads, ground loads, the external environment and non-deterministic sources such as foreign object debris (FOD) or other items that can cause damage by impacting or striking the vehicle. These damage sources can stress and damage the structure of the vehicle, leading to expensive repairs or safety concerns.

Major vehicle maintenance is driven by structural system integrity assurance. The significant maintenance burden is primarily due to the time required to disassemble components to visually examine areas for cracks and corrosion. The structural system comprises the majority of the overall aircraft and consists of many parts including the airframe, landing gear, utility system, hoists and winches, mission equipment, and emergency equipment. The airframe alone consists of thousands of parts within several major assemblies, including the cockpit, cabin, tailcone, pylon, stabilator, and engine/drive/weapon system support structure. A primary structural element (PSE) is a structural component that significantly contributes to carrying primary flight and ground loads, and is essential to the overall air vehicle integrity. Rotorcraft flight loads are complex due to their unique propulsion, rotor, and drive systems and the associated aerodynamic and vibration characteristics that produce extremely large numbers of fatigue loading cycles.

Most of the structural system besides the airframe is relatively accessible, inspectable, and replaceable. However, many portions of the airframe are impossible to inspect and extremely difficult to repair without major, time-consuming teardown. PSEs are by their nature difficult to inspect, repair and remove. Thus, while the thousands of airframe parts are maintained conditionally versus according to scheduled retirement times, the manual inspection process of determining condition through scheduled inspections is extremely manpower intensive and often results in extremely expensive and time-consuming unscheduled repairs by the time damage is discovered.

Structural health monitoring technologies have been developed over the course of many years using one or more technologies to measure indications of structural damage of components. What is lacking is a system and method for holistically taking measurements from many different structural health monitoring sensor modalities and fusing them into assessments of component condition and health, aircraft zonal structural health, and aircraft system health as a rigorous method for translating these measurements into actionable maintenance recommendations and specific service actions.

BRIEF SUMMARY

In one embodiment, a method of health monitoring and assessment of an aircraft structure includes collecting data from a plurality of sensors located at one or more components of the aircraft. The plurality of sensors assess a physical condition of the one or more components and are arrayed in one or more aircraft zones. The collected data is communicated to a health assessment module and the health assessment module calculates one or more component structural condition indicators of each component of the one or more components based on the collected data. The component structural condition indicators are compiled by component and a component structural health indicator is calculated based on one or more component structural condition indicators. The component structural health indicators are compiled by aircraft zone and a zone structural health indicator is calculated based on the component structural health indicators of components residing in the particular aircraft zone. An aircraft level health indicator is calculated based on the zone structural health indicators and one or more maintenance actions are recommended based on the component structural condition indicators.

Additionally or alternatively, in this or other embodiments the collected data includes one or more of measured structural response, flight maneuvers experienced, gross weight or center of gravity flown, component loads incurred, impacts experienced, environmental conditions experienced or component structural condition.

Additionally or alternatively, in this or other embodiments aircraft parametric data is utilized to identify flight manual exceedances via the flight manual exceedance monitor. The identified flight manual exceedances are utilized in the calculation of the one or more component structural condition indicators for selected components.

Additionally or alternatively, in this or other embodiments load sensor data is utilized to calculate an initial gross weight and center of gravity before takeoff via a gross weight and center of gravity algorithm. Aircraft parametric data is utilized to calculate a history of gross weight and center of gravity via the gross weight and center of gravity algorithm, and a load or fatigue induced damage for selected components is calculated from the history of calculated gross weight and center of gravity. The calculated load or fatigue induced damage is utilized in the calculation of the one or more component structural condition indicators for selected components.

Additionally or alternatively, in this or other embodiments aircraft parametric data is utilized to identify flight maneuvers performed via a maneuver recognition algorithm. A load or fatigue induced damage for selected components is calculated from the identified flight maneuvers, and the calculated fatigue damage is utilized in calculation of one or more component structural condition indicators for selected components.

Additionally or alternatively, in this or other embodiments loads on the one or more components are sensed via one or more load sensors. The sensed loads are communicated to the health assessment module, and the data from the load sensors is utilized to perform accumulated loads assessment for selected components. A load or fatigue induced damage is calculated from the accumulated loads assessment for selected components, and the calculated load or fatigue induced damage is utilized in calculation of one or more component structural condition indicators for selected components.

Additionally or alternatively, in this or other embodiments aircraft parametric data is utilized to calculate structural loads for selected components and the calculated structural loads are input into an accumulated loads assessment process. A load or fatigue induced damage from the accumulated loads assessment and the calculated load or fatigue damage is utilized to calculate one or more component structural condition indicators for selected components.

Additionally or alternatively, in this or other embodiments data from the plurality of sensors is utilized to detect and characterize structural impact events for selected components. An impact induced structural damage assessment is performed for selected components based on the detected structural impact events and the impact induced structural damage assessment is utilized in calculation of one or more component structural condition indicators for selected components.

Additionally or alternatively, in this or other embodiments assessing a structural condition of the one or more structural components further includes sensing a structural response of one or more structural components and comparing the sensed structural response to a baseline structure response. A structural damage assessment is performed utilizing the comparison result to assess a presence, severity, and rate of accumulation of a structural damage, and the structural damage assessment is utilized in calculation of one or more component structural condition indicators for selected components.

Additionally or alternatively, in this or other embodiments the structural damage assessment is based on sensed structural responses collected at common temperature or flight conditions.

Additionally or alternatively, in this or other embodiments corrosion on the one or more components is sensed via one or more corrosion sensors and the sensed corrosion is communicated to the health assessment module. A corrosion assessment is determined utilizing the sensed corrosion and is incorporated into the component structural condition indicator.

Additionally or alternatively, in this or other embodiments the one or more corrosion sensors detect degradation of paint and/or coating of the one or more structural components.

Additionally or alternatively, in this or other embodiments an aircraft environmental operating condition is determined and the corrosion assessment is determined utilizing the aircraft environmental operating condition.

Additionally or alternatively, in this or other embodiments the aircraft environmental operating condition is determined directly utilizing one or more on-aircraft environmental sensors.

Additionally or alternatively, in this or other embodiments the aircraft environmental operating condition is determined indirectly utilizing geographic location and proximity to salt water or industrial activity or the like.

Additionally or alternatively, in this or other embodiments the aircraft environmental operating condition includes one or more of chloride levels, relative humidity, temperature or sulfur levels.

In another embodiment, a system for health monitoring and assessment of an aircraft structure includes a plurality of sensors located at one or more components of the aircraft to assess a physical condition of the components, the plurality of sensors arrayed in one or more aircraft zones. A health assessment module is operably connected to the plurality of sensors and is configured to calculate one or more component structural condition indicators of each component of the one or more components based on the collected data and compile the component structural condition indicators by component. A component structural health indicator is calculated based the on one or more component structural condition indicators and component structural health indicators are compiled by aircraft zone. A zone structural health indicator is calculated based on the component structural health indicators of components residing in the particular aircraft zone and an aircraft level health indicator is calculated based on the zone structural health indicators. One or more maintenance actions are recommended based on the component structural condition indicators.

Additionally or alternatively, in this or other embodiments the health assessment module is further configured to utilize aircraft parametric data to identify flight manual exceedances via the flight manual exceedance monitor and utilize the identified flight manual exceedances in the calculation of the one or more component structural condition indicators for selected components.

Additionally or alternatively, in this or other embodiments the system includes a plurality of load sensors, wherein the health assessment module is further configured to utilize load sensor data to calculate an initial gross weight and center of gravity before takeoff via a gross weight and center of gravity algorithm, utilize aircraft parametric data to calculate a history of gross weight and center of gravity via the gross weight and center of gravity algorithm, calculate a load or fatigue induced damage from the history of calculated gross weight and center of gravity for selected components, and utilize the calculated fatigue damage in the calculation of the one or more component structural condition indicators for selected components.

Additionally or alternatively, in this or other embodiments the health assessment module is further configured to utilize aircraft parametric data to identify flight maneuvers performed via a maneuver recognition algorithm, calculate a load or fatigue induced damage from identified maneuvers for selected components, and utilize the calculated fatigue damage in calculation of one or more component structural condition indicators for selected components.

Additionally or alternatively, in this or other embodiments the system further includes one or more load sensors, wherein the health assessment module is further configured to utilize data from the load sensors to perform accumulated loads assessments for selected components, calculate a load or fatigue induced damage from accumulated loads assessment for selected components, and utilize the calculated load or fatigue induced damage in calculation of one or more component structural condition indicators for selected components.

Additionally or alternatively, in this or other embodiments the health assessment module is further configured to utilize aircraft parametric data to calculate structural loads for selected components, input the calculated structural loads into an accumulated loads assessment process for selected components, calculate a load or fatigue induced damage from the accumulated loads assessment for selected components, and utilize the calculated load or fatigue damage to calculate one or more component structural condition indicators for selected components.

Additionally or alternatively, in this or other embodiments the health assessment module is further configured to utilize data from the plurality of sensors to detect and characterize structural impact events for selected components, perform an impact induced structural damage assessment for selected components based on the detected structural impact events, and utilize the impact induced structural damage assessment in calculation of one or more component structural condition indicators for selected components.

Additionally or alternatively, in this or other embodiments the health assessment module is further configured to compare a sensed structural response to a baseline structure response, perform a structural damage assessment utilizing the comparison result to assess a presence, severity, and rate of accumulation of a structural damage, and utilize the structural damage assessment in calculation of one or more component structural condition indicators for selected components.

Additionally or alternatively, in this or other embodiments one or more corrosion sensors are located at one or more components, wherein the health assessment module is further configured to determine a corrosion assessment utilizing the sensed corrosion, the corrosion assessment incorporated into the component structural condition indicator.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
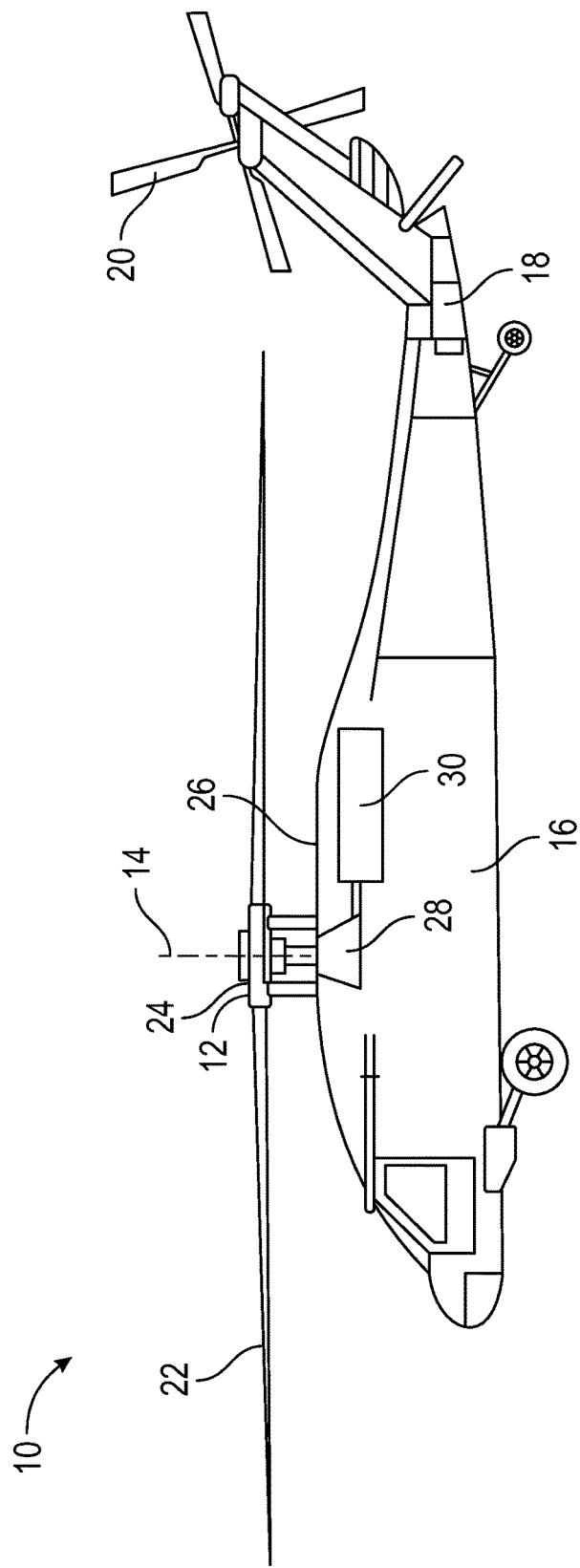
FIG. 1 is a general side view of an exemplary rotary wing aircraft for use in accordance with embodiments.

FIG. 1 illustrates an exemplary rotary-winged aircraft 10 having a main rotor system 12, which rotates about a rotor axis 14. The aircraft 10 includes an airframe 16 which supports the main rotor system 12 as well as an extending tail 18 including a tail rotor 20. The main rotor system 12 includes a plurality of rotor blade assemblies 22 mounted to a rotor hub assembly 24. The main rotor system 12 is driven by a transmission 26. The transmission 26 includes a main gearbox 28 driven by one or more engines, illustrated schematically at 30. The main gearbox 28 and engines 30 are considered as part of the non-rotating frame of the aircraft 10. In the case of a rotary wing aircraft, the main gearbox 28 may be interposed between one or more gas turbine engines 30 and the main rotor system 12. Although a particular rotary wing aircraft configuration is illustrated and described in the disclosed non-limiting embodiment, other configurations and/or machines with rotor systems are within the scope of the present invention. Further, one skilled in the art will readily appreciate that the present disclosure may be utilized in other, non-rotary winged aircraft applications. It is to be appreciated that while the description herein relates to a rotary wing aircraft, the disclosure herein may be as readily applied to aircraft, ground vehicles or most other structures.

Figure 2:
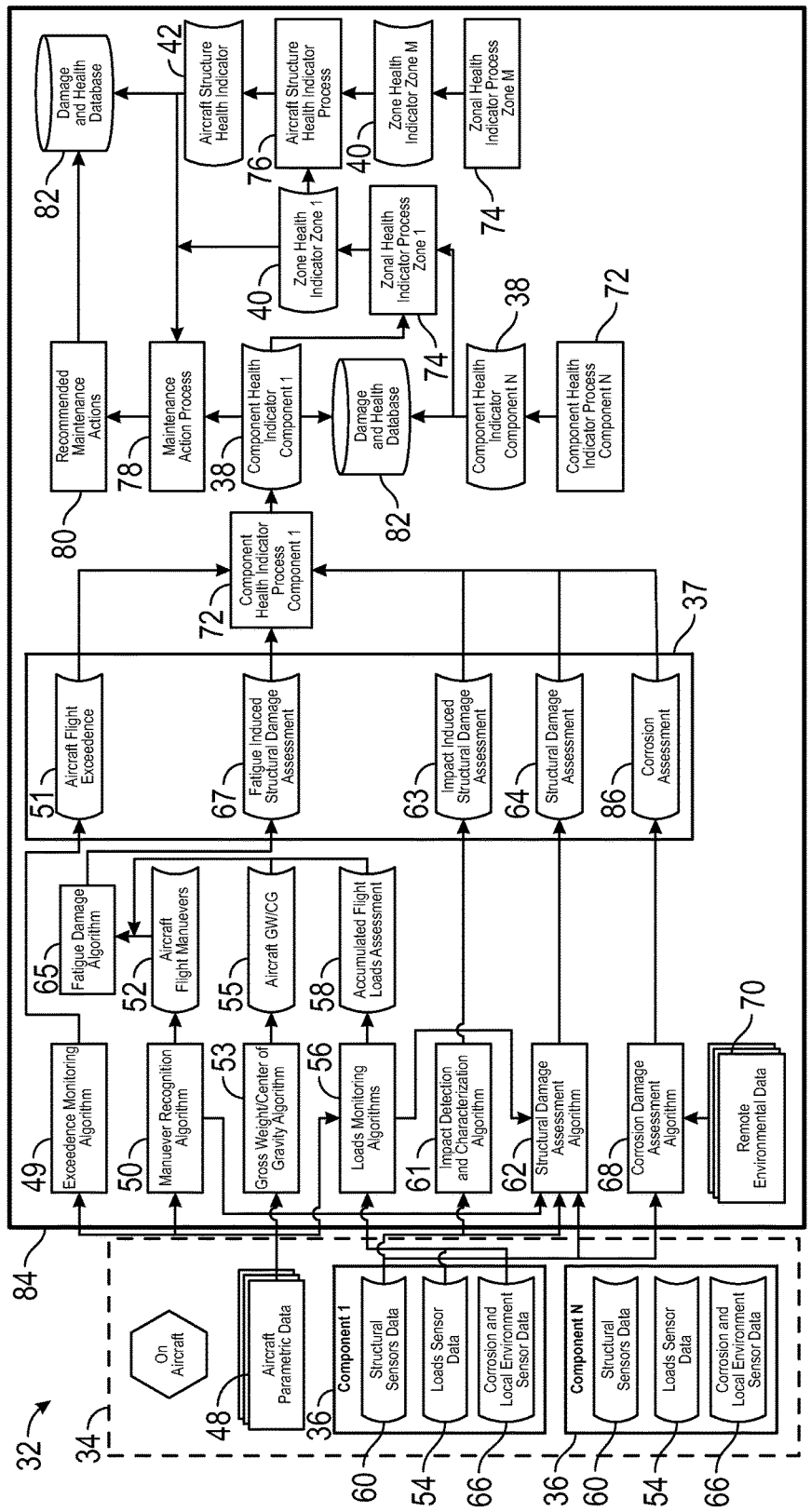
FIG. 2 is a schematic view of an exemplary health monitoring system for an aircraft structure.

Shown in FIG. 2 is a schematic of an exemplary health assessment system 32 for the aircraft 10 structure. The system 32 collects and manages sensor data from various sources, assesses component condition, and assesses aircraft structural health data and translates the sensor data condition and health assessments into recommended maintenance or service actions.

Figure 3:
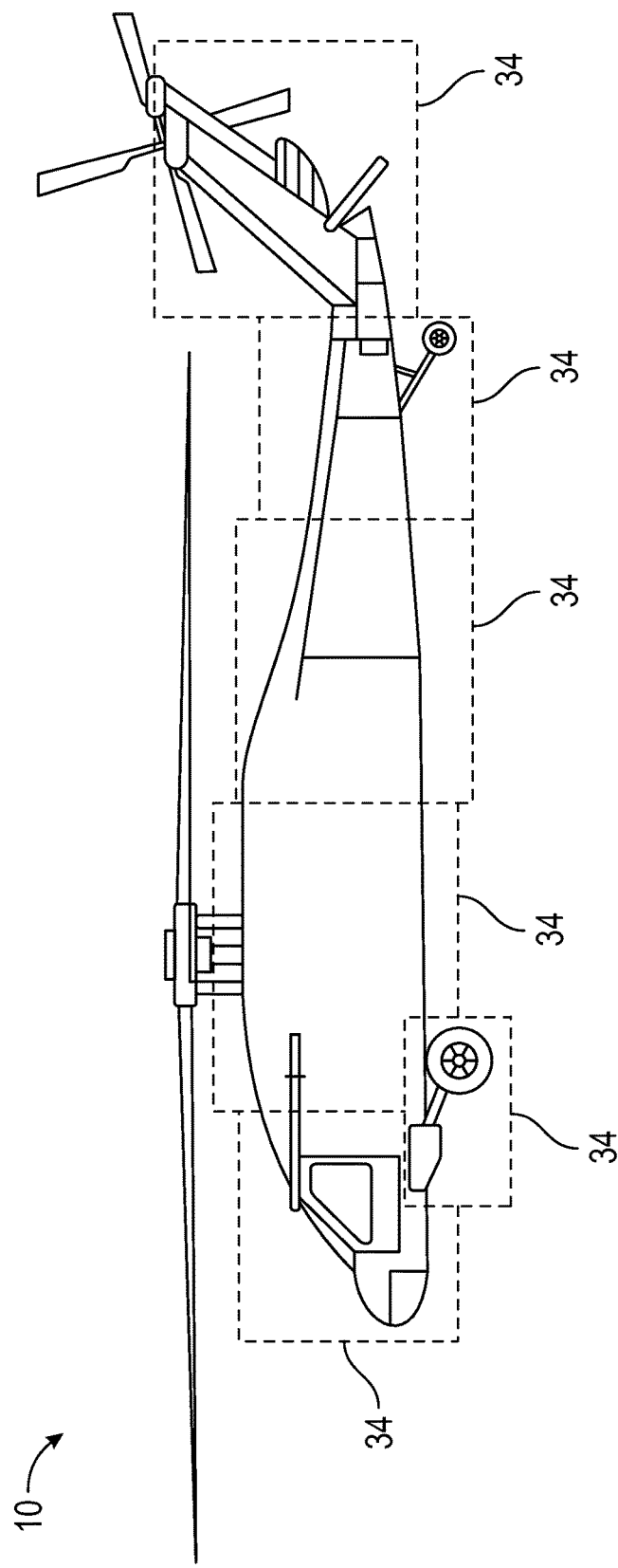
FIG. 3 is a schematic view of aircraft structural zones.

Initially, the aircraft 10 is divided into discrete structural zones 34, examples of which are shown in FIG. 3. The zones 34 are defined based on, for example, design or manufacturing areas, or based on existing maintenance practices. Further, combinations of the above and/or other rationale may be used to define zones 34. Further, one or more particular structural components 36 are identified in each zone 34. Referring again to FIG. 2, the system 32 utilizes a health assessment module 84 to calculate a component structural health indicator 38 for each particular structural component 36, and likewise a zone structural health indicator 40 can be determined for each zone 34, based on the component structural health indicators 38 for the particular structural components 36 of that particular zone 34. Finally, the zone structural health indicators 40 are utilized to provide an aircraft structural health indicator 42. In some embodiments, the health assessment module 84 is located on board the aircraft 10, while in other embodiments, the health assessment module 84 is located remotely from the aircraft 10, and data necessary for use by the health assessment module 84 is communicated from the aircraft 10 to the health assessment module 84. In yet other embodiments, various sub-modules within the health assessment module 84 are located on board the aircraft 10 and various other sub-modules are located remotely from the aircraft 10. Alternative embodiments of the health assessment module 84 may locate remote submodules in ground-based software processors located at the aircraft operator sites of operation, the aircraft original equipment manufacturer or a third party health management service provider.

For each particular structural component 36, one or more condition or health assessment drivers are established in order to determine the primary characteristics of the particular structural component 36 to be monitored. Established condition or health assessment drivers are used to define one or more component structural condition indicators 37 and the component health indicator 38, derived from the structural condition indicators 37. In some embodiments, design data; failure modes, effects, and criticality assessments; subject matter expert/aircraft maintainer input; and/or historical maintenance records may be utilized as assessment driver input to establish the primary assessment drivers and thereby the monitoring requirements of the particular structural component 36. This allows each particular structural component 36 and/or zone 34 to be uniquely monitored for specific primary failure modes, enhancing detection capability and reducing unnecessary infrastructure and thereby system complexity, cost, and weight.

One type of information utilized to determine the component structural condition indicator 37 is aircraft parametric data 48. This parametric data 48, which may include aircraft states, such as velocity, acceleration, attitude, attitude rate of change, control stick position, control commands or the like, is used by a flight manual exceedance monitor 49 to detect and record flight manual exceedances 51 that require immediate post-flight inspections or maintenance actions.

Parametric data 48 is also utilized in a maneuver recognition algorithm 50 which recognizes discrete maneuvers or maneuver combinations performed by the aircraft 10. The maneuver recognition algorithm 50 identifies maneuvers 52 detected in the course of flight activity.

To complement the maneuver recognition algorithm 50, a gross weight (GW) & center of gravity (CG) algorithm 53 calculates GW and CG 55 from load sensor data collected via, for example, loads sensors 54 such as landing gear sensors when the aircraft is on the ground. Changes in GW and CG 55 that occur in flight, for example due to fuel burn or changes in aircraft payload, are inferred from aircraft parametric data 48.

To further complement the maneuver recognition algorithm 50, particular structural components 36 may have loads monitored directly via one or more loads sensors 54. In particular, the loads sensors 54 may be utilized to monitor for structural exceedances or overloads, which can have immediate and long-term effects on component structural health, as compared to flight maneuvers not resulting in overload conditions. The loads sensor 54 data is utilized by a loads monitoring algorithm 56 to result in an accumulated loads assessment 58 for each load sensor-equipped structural component 36. Load monitoring algorithm 56 also uses virtual monitoring of load methods to infer structural loads for structural components 36 that do not have load sensors using data or information from different sources such as parametric data 48, structural sensors 60, load sensors 54 installed elsewhere in the aircraft or GW/CG 55.

In some structural components 36, structural damage due to impact from foreign objects such as birds, debris, ballistic projectiles and the like is a key driver of structural degradation or failure. For such components 36, an impact induced structural damage assessment 63 is performed by an impact detection and characterization algorithm 61. The structural damage due to impact for such components 36 is also monitored directly via structural sensors 60 applied to the structural components 36. In some embodiments, the structural sensors 60 are piezoelectric or eddy current sensors. A structural damage assessment algorithm 62 is utilized to assess the structural sensor 60 data, comparing previous or baseline sensor data to current sensor measurements to assess the presence, severity, and the rate of accumulation of the damage. A structural damage assessment 64 is output from the structural damage assessment algorithm 62. Since previous measurements or a baseline measurement is used for comparison, ensuring that current conditions closely match the previous or baseline conditions, as measured by loading and temperature, is important to maximize sensor information accuracy. Therefore, the structural damage assessment algorithm 62 uses environmental sensors 66 to monitor temperature and the maneuver recognition algorithm 50 and the load monitoring algorithm 56 to select common flight condition windows for data collection, thereby minimizing potential error in the comparison.

In some structural components 36, structural damage due to loads or fatigue is a key driver of structural degradation or failure. For such components 36, load or fatigue induced structural damage assessment 67 is performed by the fatigue damage algorithm 65 using identified maneuvers 52, GW/CG 55 and/or accumulated loads assessment 58. The structural damage due to loads or fatigue for such components 36 is also monitored directly via structural sensors 60 applied to the structural components 36.

Corrosion is a function of environment more than anything else and much of the actual damage occurs during aircraft down-time rather than during operations. The current calendar-based inspection methods are not optimized and often produce few corrosion indications that are visible with the limited teardown performed. Yet corrosion can be present and progressing to levels expensive to repair in more deeply embedded compartments. On-aircraft environmental or corrosion sensors 66 are placed on selected structural components 36, within embedded components or within aircraft zones 34 to directly monitor local environmental conditions on or nearby the selected structural components 36. The structural components 36 may be selected based on historical occurrences of corrosion, difficulty in directly observing the structural component 36 during a traditional visual inspection, or other factors. In some embodiments, degradation of paint or coatings is sensed along with substrate corrosion, since typically degradation of the coating must occur prior to substrate damage.

Data from the environment or corrosion sensors 66 are input into a corrosion assessment algorithm 68. Further, since corrosion is largely a function of operational environment, aircraft operational environmental data from off-aircraft environmental sensors 70 such as chloride levels, relative humidity, temperature and sulfur levels are also input into the corrosion assessment algorithm 68. These off-aircraft conditions may be directly measured or inferred from geographic location and proximity to, for example, salt water or industrial activity. The corrosion assessment algorithm 68 then outputs a corrosion assessment 86. The structural damage due to corrosion of components 36 is also monitored directly via structural sensors 60 applied to the structural components 36.

Utilizing the technologies and methods described above, health assessment is performed on a component-by-component basis. The flight manual exceedances 51, likelihood of load or fatigue induced structural damage 67, the impact induced structural damage assessment 63, the structural damage assessment 64, and the corrosion assessment 86 of each specific structural component 36 represents the set of condition indictors 37 for the targeted structural component 36 that is input into a component health indicator process 72 to calculate component health indicators 38. Each component structural health indicator 38 for a particular zone 34 is input into a corresponding zonal health indicator process 74, which considers the significance of a particular structural component 36 for flight safety and/or mission fulfillment. The zonal health indicator process 74 outputs the zone structural health indicator 40. The zone structural health indicators 40 are then utilized by an aircraft structural health indicator process 76, which outputs the aircraft structural health indicator 42, again taking flight safety and/or mission fulfillment into account.

In some embodiments, the health indicators 38, 40, 42 calculated by health indicator processes 72, 74, 76 also feed a maintenance action process 78, which based on the information provided may trigger one or more recommended maintenance actions 80, such as inspection, repair or replacement of selected structural components 36, while alerting maintenance personnel to flight critical or mission essential issues. The structural health assessment system 32 further records all of the collected data to an assessment and health database 82 for future use as needed.

The method and system of the present disclosure allow for maintenance practices to be shifted from the current schedule or calendar based approaches to making maintenance decision based on component condition and aircraft health, using aircraft structural health information available in real-time, without special, specific inspections being required until warranted by indications of degraded structural health sufficient to compromise aircraft airworthiness or mission effectiveness. Further, this integrated health assessment approach allows for service life modifications or design modification implementations to be based on the structural health of the specific component, zone or aircraft, and not just on a visual inspection process typically based on total flight hours or calendar time. As such, significant time and material savings may be realized in overhaul, repair, and service of the aircraft. Further, the system and method disclosed herein allows for a better setting of aircraft inspection intervals based on actual aircraft usage and maneuvers performed or exposure to adverse environmental conditions. Finally, the system and method disclosed herein may be utilized to provide information regarding particularly damaging maneuvers to aid in avoiding future such damage through revised flight procedures and pilot training.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of health monitoring and assessment of an aircraft structure comprising:
    collecting data from a plurality of sensors associated with a plurality of components distributed throughout a plurality of discrete zones of the aircraft, at least one of the plurality of components being associated with each of the plurality of discrete aircraft zones, the plurality of sensors assessing a physical condition of the plurality of components;
    communicating the collected data to a health assessment module;
    calculating one or more component structural condition indicators of each component of the plurality of components based on the collected data;
    compiling component structural condition indicators by component;
    calculating a component structural health indicator for each component based on one or more component structural condition indicators;
    compiling component structural health indicators by each of the plurality of discrete aircraft zones;
    calculating a zone structural health indicator based on the component structural health indicators of components residing in the particular discrete aircraft zone;
    calculating an aircraft level health indicator based on the zone structural health indicators; and
    recommending one or more maintenance actions based on the component structural condition indicators.

2. The method of claim 1, wherein the collected data includes one or more of a measured structural response, flight maneuvers experienced, changes in gross weight or center of gravity, component loads incurred, impacts experienced, environmental conditions experienced and a component structural condition.

3. The method of claim 1, further comprising:
    utilizing aircraft parametric data to identify flight manual exceedances via a flight manual exceedance monitor;
    utilizing the identified flight manual exceedances in the calculation of the one or more component structural condition indicators for selected components.

4. The method of claim 1, further comprising:
    utilizing load sensor data to calculate an initial gross weight and center of gravity before takeoff via a gross weight and center of gravity algorithm;
    utilizing aircraft parametric data to calculate a history of gross weight and center of gravity via the gross weight and center of gravity algorithm;
    calculating a load or fatigue induced damage for selected components from the history of calculated gross weight and center of gravity; and
    utilizing the calculated load or fatigue damage in the calculation of the one or more component structural condition indicators for selected components.

5. The method of claim 1, further comprising:
    utilizing aircraft parametric data to identify flight maneuvers performed via a maneuver recognition algorithm;
    calculating a load or fatigue induced damage from identified maneuvers for selected components; and
    utilizing the calculated fatigue damage in calculation of one or more component structural condition indicators for selected components.

6. The method of claim 1, further comprising:
    sensing loads on the plurality of components via one or more load sensors;
    communicating the sensed loads to the health assessment module;
    utilizing data from the load sensors to perform accumulated loads assessment for selected components;
    calculating a load or fatigue induced damage from the accumulated loads assessment for selected components; and
    utilizing the calculated load or fatigue induced damage in calculation of the one or more component structural condition indicators for selected components.

7. The method of claim 1, further comprising:
    utilizing aircraft parametric data to calculate structural loads for selected components;
    inputting the calculated structural loads into an accumulated loads assessment process;
    calculating a load or fatigue induced damage from the accumulated loads assessment; and
    utilizing the calculated load or fatigue damage to calculate one or more component structural condition indicators for selected components.

8. The method of claim 1, further comprising:
    utilizing data from the plurality of sensors to detect and characterize structural impact events for selected components;
    performing an impact induced structural damage assessment for selected components based on the detected structural impact events; and
    utilizing the impact induced structural damage assessment in calculation of the one or more component structural condition indicators for selected components.

9. The method of claim 1, wherein assessing a structural condition of the one or more structural components further comprises:
    sensing a structural response of one or more structural components;
    comparing the sensed structural response to a baseline structure response;
    performing a structural damage assessment utilizing the comparison result to assess a presence, severity, and rate of accumulation of a structural damage; and utilizing the structural damage assessment in calculation of one or more component structural condition indicators for selected components.

10. The method of claim 9, wherein the structural damage assessment is based on sensed structural responses collected at common temperature or flight conditions.

11. The method of claim 1, further comprising:
sensing corrosion on the plurality of components via one or more corrosion sensors;
communicating the sensed corrosion to the health assessment module; and
determining a corrosion assessment utilizing the sensed corrosion, the corrosion assessment incorporated into each of the component structural condition indicators.

12. The method of claim 11, wherein the one or more corrosion sensors detect degradation of paint and/or coating of the at least one of the plurality of components.

13. The method of claim 11, further comprising:
determining an aircraft environmental operating condition; and
determining the corrosion assessment utilizing the aircraft environmental operating condition.

14. The method of claim 13, wherein the aircraft environmental operating condition is determined directly utilizing one or more on-aircraft environmental sensors.

15. The method of claim 13, wherein the aircraft environmental operating condition is determined indirectly utilizing geographic location and proximity to salt water or industrial activity or the like.

16. The method of claim 13, wherein the aircraft environmental operating condition includes one or more of chloride levels, relative humidity, temperature and sulfur levels.

17. A system for health monitoring and assessment of an aircraft structure comprising:
a plurality of components distributed through a plurality of discrete zones of the aircraft structure, at least one of the plurality of components being associated with each of the plurality of discrete aircraft zones;
a plurality of sensors disposed at the plurality of components of the aircraft to assess a physical condition of the components, the plurality of sensors arrayed in the plurality of aircraft zones;
a health assessment module operably connected to the plurality of sensors and configured to:
calculate one or more component structural condition indicators of each component of the plurality of components based on the data collected by the plurality of sensors;
compile the component structural condition indicators by component;
calculate one or more component structural health indicators based on the one or more component structural condition indicators;
compile component structural health indicators by aircraft zone;
calculate a zone structural health indicator based on the component structural health indicators of components residing in the particular aircraft zone;
calculate an aircraft level health indicator based on the zone structural health indicators; and
recommend one or more maintenance actions based on the component structural condition indicators.

18. The system of claim 17, wherein the health assessment module is further configured to:
utilize aircraft parametric data to identify flight manual exceedances via a flight manual exceedance monitor; and
utilize the flight manual exceedances in the calculation of the one or more component structural condition indicators for selected components.

19. The system of claim 17, further comprising a plurality of load sensors;
wherein the health assessment module is further configured to:
utilize load sensor data to calculate an initial gross weight and center of gravity before takeoff via a gross weight and center of gravity algorithm;
utilize aircraft parametric data to calculate a history of gross weight and center of gravity via the gross weight and center of gravity algorithm;
calculate a load or fatigue induced damage from the history of calculated gross weight and center of gravity for selected components; and
utilize the calculated fatigue damage in the calculation of the one or more component structural condition indicators for selected components.

20. The system of claim 17, wherein the health assessment module is further configured to:
utilize aircraft parametric data to identify flight maneuvers performed via a maneuver recognition algorithm;
calculate a load or fatigue induced damage from identified maneuvers for selected components; and
utilize the calculated fatigue damage in calculation of the one or more component structural condition indicators for selected components.

21. The system of claim 17, further comprising one or more load sensors;
wherein the health assessment module is further configured to:
utilize data from the load sensors to perform accumulated loads assessments for selected components;
calculate a load or fatigue induced damage from accumulated loads assessment for selected components; and
utilize the calculated load or fatigue induced damage in calculation of the one or more component structural condition indicators for selected components.

22. The system of claim 17, wherein the health assessment module is further configured to:
utilize aircraft parametric data to calculate structural loads for selected components;
input the calculated structural loads into an accumulated loads assessment process for selected components;
calculate a load or fatigue induced damage from the accumulated loads assessment for selected components; and
utilize the calculated load or fatigue damage to calculate the one or more component structural condition indicators for selected components.

23. The system of claim 17, wherein the health assessment module is further configured to:
utilize data from the plurality of sensors to detect and characterize structural impact events for selected components;
perform an impact induced structural damage assessment for selected components based on the detected structural impact events; and
utilize the impact induced structural damage assessment in calculation of the one or more component structural condition indicators for selected components.

24. The system of claim 17, wherein the health assessment module is further configured to:

compare a sensed structural response to a baseline structure response;

perform a structural damage assessment utilizing the comparison result to assess a presence, severity, and rate of accumulation of a structural damage, and utilize the structural damage assessment in calculation of the one or more component structural condition indicators for selected components.

25. The system of claim 17, further comprising one or more corrosion sensors disposed at one or more components;

wherein the health assessment module is further configured to determine a corrosion assessment utilizing the sensed corrosion, the corrosion assessment incorporated into the component structural condition indicator.

* * * * *